(12) United States Patent
Licardie et al.

(10) Patent No.: US 8,264,959 B2
(45) Date of Patent: *Sep. 11, 2012

(54) DYNAMIC LOAD BALANCING FOR LAYER-2 LINK AGGREGATION

(75) Inventors: Sergio Licardie, Cupertino, CA (US); Chaoming Zeng, Milpitas, CA (US)

(73) Assignee: Harris Stratex Networks Operating Corporation, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/816,354

(22) Filed: Jun. 15, 2010

(65) Prior Publication Data

US 2010/0246396 A1 Sep. 30, 2010

(51) Int. Cl.
*H04L 12/26* (2006.01)
*H04J 3/14* (2006.01)
(52) U.S. Cl. ............ 370/230.1; 370/231; 370/232; 370/235; 370/477
(58) Field of Classification Search ............ 370/230.1, 370/231, 232, 235, 477
See application file for complete search history.

(56) References Cited

U.S. PATENT DOCUMENTS

| | | |
|---|---|---|
| 4,941,089 A | 7/1990 | Fischer |
| 6,434,165 B1 | 8/2002 | Sherer et al. |
| 6,501,749 B1 | 12/2002 | Alexander et al. |
| 6,512,742 B1 | 1/2003 | Alexander et al. |
| 6,535,489 B1 | 3/2003 | Merchant et al. |
| 6,625,152 B1 | 9/2003 | Monsen et al. |
| 6,675,243 B1 | 1/2004 | Bastiani et al. |
| 6,850,486 B2 | 2/2005 | Saleh et al. |
| 6,910,149 B2 | 6/2005 | Perloff et al. |
| 6,928,056 B2 | 8/2005 | Evans |
| 6,952,401 B1 | 10/2005 | Kadambi et al. |
| 7,010,607 B1 | 3/2006 | Bunton |
| 7,023,797 B2 | 4/2006 | Tagore-Brage |
| 7,145,866 B1 | 12/2006 | Ting et al. |
| 7,266,079 B2 | 9/2007 | Fan |
| 7,529,180 B1 | 5/2009 | Karl et al. |
| 7,551,616 B2 * | 6/2009 | Devi et al. .................... 370/389 |
| 7,613,110 B1 * | 11/2009 | Blair ............................ 370/230 |
| 7,639,614 B2 | 12/2009 | Nakagawa et al. |

(Continued)

FOREIGN PATENT DOCUMENTS

WO 0072531 11/2000

OTHER PUBLICATIONS

Link Aggregation According to IEEE Standard 802.3ad; White Paper, Oct. 10, 2002; v1.10; pp. 1-21; SysKonnect GmbH; San Jose, California.

(Continued)

*Primary Examiner* — Chi Pham
*Assistant Examiner* — Ahmed Elallam
(74) *Attorney, Agent, or Firm* — Sheppard, Mullin, Richter & Hampton LLP

(57) ABSTRACT

Load balancing for layer-2 link aggregation involves initial assignment of link aggregation keys (LAGKs) and reassignment of LAGKs when a load imbalance condition that merits action is discovered. Load conditions change dynamically and for this reason load balancing tends to also be dynamic. Load balancing is preferably performed when it is necessary. Thus an imbalance condition that triggers load balancing is preferably limited to conditions such as when there is frame drop, loss of synchronization or physical link capacity exceeded.

19 Claims, 7 Drawing Sheets

U.S. PATENT DOCUMENTS

| | | | |
|---|---|---|---|
| 7,787,370 B1 * | 8/2010 | Aweya et al. | 370/230 |
| 7,804,761 B2 | 9/2010 | Rosenhouse et al. | |
| 7,876,747 B2 * | 1/2011 | Elangovan et al. | 370/382 |
| 7,898,959 B1 * | 3/2011 | Arad | 370/235 |
| 7,911,953 B1 * | 3/2011 | Prestor et al. | 370/235 |
| 8,018,843 B2 * | 9/2011 | Dunbar et al. | 370/225 |
| 8,094,559 B1 * | 1/2012 | Bly et al. | 370/235 |
| 2002/0054567 A1 | 5/2002 | Fan | |
| 2003/0054829 A1 | 3/2003 | Moisio | |
| 2003/0117945 A1 | 6/2003 | Zboril | |
| 2003/0128706 A1 | 7/2003 | Mark et al. | |
| 2004/0208552 A1 | 10/2004 | Harney et al. | |
| 2004/0228278 A1 | 11/2004 | Bruckman et al. | |
| 2005/0063701 A1 | 3/2005 | Ovadia et al. | |
| 2005/0152369 A1 | 7/2005 | Ambe et al. | |
| 2005/0157759 A1 | 7/2005 | Ohno et al. | |
| 2005/0193309 A1 | 9/2005 | Grilli et al. | |
| 2005/0213547 A1 | 9/2005 | Meier | |
| 2005/0281204 A1 | 12/2005 | Karol et al. | |
| 2006/0031482 A1 | 2/2006 | Mohan et al. | |
| 2006/0045031 A1 | 3/2006 | Hickey et al. | |
| 2006/0098573 A1 * | 5/2006 | Beer et al. | 370/230 |
| 2006/0221974 A1 | 10/2006 | Hilla et al. | |
| 2006/0251106 A1 | 11/2006 | Nakagawa et al. | |
| 2007/0189154 A1 | 8/2007 | Hourtane et al. | |
| 2007/0237172 A1 | 10/2007 | Zelig et al. | |
| 2007/0280258 A1 | 12/2007 | Rajagopalan et al. | |
| 2008/0068983 A1 | 3/2008 | Dunbar et al. | |
| 2010/0142560 A1 | 6/2010 | Sharivker et al. | |
| 2010/0215058 A1 | 8/2010 | Yakov et al. | |

OTHER PUBLICATIONS

Brown, Andrew; IEEE 802.17 Resilient Packet Ring (RPR) Standards Update; NANOG Feb. 2003; pp. 1-14.

Making Sonet Ethernet-Friendly; Light Reading; Mar. 25, 2003; pp. 1-16; http://www.lightreading.com/document.asp?doc_id=30194; Light Reading Inc.; New York, New York.

Understanding Rapid Spanning Tree Protocol (802.1w); Document ID: 24062; White Paper; Updated Sep. 1, 2005; pp. 1-19; http://www.cisco.com/warp/public/473/146.html; Cisco Systems, Inc.

Search Report mailed Sep. 21, 2007 for International Serial No. PCT/US2006/006722 filed Feb. 24, 2006 as published under International Publication No. WO2007/094795.

Search Report mailed Jul. 28, 2008 for International Serial No. PCT/US2008/064600 filed May 22, 2008.

Office Action mailed Sep. 16, 2009 for U.S. Appl. No. 11/753,312, filed May 24, 2007.

Notice of Allowance mailed Mar. 9, 2010 for U.S. Appl. No. 11/753,312, filed May 24, 2007.

Search Report mailed Nov. 24, 2008 for International Serial No. PCT/US2008/075618 filed Sep. 8, 2008.

Office Action mailed Mar. 2, 2010 for U.S. Appl. No. 12/205,791, filed Sep. 5, 2008.

Office Action mailed Jun. 27, 2008 from U.S. Appl. No. 11/351,983, filed Feb. 10, 2006.

Office Action mailed Jun. 23, 2009 from U.S. Appl. No. 11/351,983, filed Feb. 10, 2006.

Office Action mailed Jun. 22, 2010 from U.S. Appl. No. 11/351,983, filed Feb. 10, 2006.

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications," ISBN 978-0/7381-4740-6, Section 43, pp. 285-349, Jan. 1, 2005.

European Patent Application Serial No. 08795867.4, Supplementary Search Report mailed Oct. 25, 2010.

European Patent Application Serial No. 08829704.9, Supplementary Search Report mailed Jan. 30, 2012.

* cited by examiner

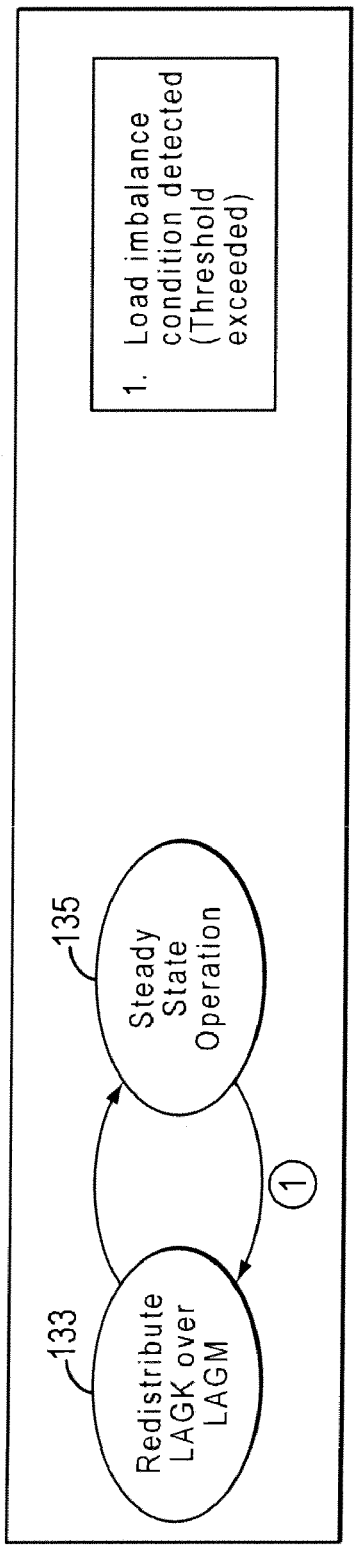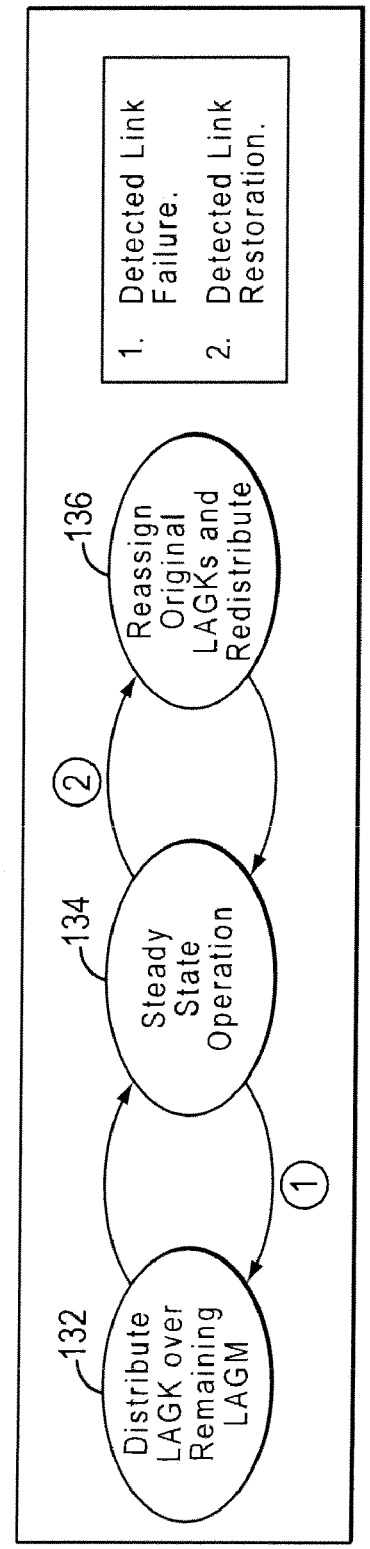

DYNAMIC LOAD BALANCING FOR LAYER-2 LINK AGGREGATION

CROSS-REFERENCE TO RELATED APPLICATION

The present application claims priority benefit to U.S. Nonprovisional patent application Ser. No. 11/753,312, filed May 24, 2007, entitled "Dynamic Load Balancing for Layer-2 Link Aggregation" which is incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This application related to data communications and more particularly to load balancing in data communications via networks such as wireless communication networks.

BACKGROUND

Data communication network architectures often have a layered structure designed for communication protocols, such as TCP/IP (transmission control protocol/Internet protocol), OSI (open systems interconnection) and SNA (system network architecture), which implement the protocol stack. With such layered structure, the protocols enable an entity in one host to interact with a corresponding entity at the same layer in a remote host. The TCP/IP protocol, for example, is a set of communication protocols that includes lower-layer protocols (such as TCP and IP) and upper-layer protocols for applications such as electronic mail, terminal emulation, and file transfer. TCP/IP can be used to communicate across any set of interconnected networks, LAN and WAN. The OSI reference model (also referred to as the OSI model) is an abstract description of a networking system divided into layers. Within each layer, one or more entities implement its functionality. According to the OSI model, each entity interacts directly with the layer immediately beneath it, and provides facilities for use by the layer above it.

Although the protocol stack may be different for each protocol, we generically refer to the lower protocol layers as layer-2 and layer-1, respectively. The lowest layer in the stack is layer-1 (or physical layer as it is also referred to). The physical layer provides the functional and procedural means for defining all the electrical and physical specifications for devices as well as for establishing and terminating connections to communication mediums on the network. Above it, layer-2 provides a forwarding domain in which devices such as bridges and switches operate. That is, layer-2 provides the functional and procedural means to transfer data between network entities and to detect and possibly correct errors that may occur in the physical layer.

For increased bandwidth and availability of communication channels between nodes (e.g., switches and stations), link aggregation or trunking is a method of grouping physical network links into a single logical link, i.e., a single transport channel (according to IEEE standard 802.3ad). With link aggregation, it is possible to increase capacity of communication channels between nodes using their Fast Ethernet and Gigabit Ethernet technology. Two or more Gigabit Ethernet connections can be grouped to increase bandwidth, and to create resilient and redundant links. Standard local area network (LAN) technology provides data rates of 10 Mbps, 100 Mbps and 1000 Mbps and, for obtaining higher capacity (e.g., 10000 Mbps) link aggregation allows grouping of 10 links; and where factors of ten (10) are excessive, link aggregation can provide intermediate rates by grouping links with different rates.

Layer-2 link aggregation can be used in various types of data communications, including transport channel, Ethernet port and the like. Layer-2 link aggregation uses special patterns or features of data traffic. Examples of such patterns are destination and source addresses such as MAC and IP addresses (MAC—media access control). These patterns can make traffic load balancing difficult to handle in layer-2 link aggregation operations, therefore making it desirable to have a better load balancing scheme.

SUMMARY

Various embodiments of the present invention are possible, examples of which are provided herein. For the purpose of the invention as shown and broadly described herein the exemplary embodiments include a method and a system.

One embodiment is a method for providing dynamic load balancing in a data communications system. Such method may include creating a link aggregation group in a data communications system with a plurality of physical links each of which having a capacity for transporting egress data or any part thereof. The link aggregation group is formed by combining two or more of the plurality of physical links into a single logical link for egress data. The method may also include allocating to the link aggregation group a set of link aggregation keys each of which being assigned to a particular one of the physical links in the link aggregation group. The method may further include deriving from egress data a data rate for each of the link aggregation keys, and performing dynamic load balancing based on the data rates and capacities of the physical links in the link aggregation group.

Various aspects and attributes may apply to the foregoing steps. The dynamic load balancing may include detecting conditions that trigger load balancing, wherein the conditions may include a frame drop associated with an egress buffer overflow status and require monitoring the egress buffer overflow status. The dynamic load balancing may include monitoring traffic loads based on egress data and accumulating the data rates for calculating the traffic loads; or it may include monitoring for changes in data communications system conditions, including failure and recovery, based on which the dynamic load balancing is triggered. The changes may include failure or recovery of a physical link which result in diversion of egress data to remaining one or more of the physical links in the link aggregation group. When such diversion causes a data rate to substantially reach or exceed the capacity of any remaining one or more of the physical links, dynamic load balancing may prove beneficial. Thus, one of the conditions that may trigger dynamic load balancing when discovered is link capacity imbalance. Other conditions, such as loss of one or more frames (frame drop condition) or loss of synchronization between such frames, may also trigger dynamic load balancing when discovered, alone or in combination with link capacity imbalance.

Egress data regularly includes a plurality of frames each of which having its own payload and identifying information based on which a respective key value is calculated and as to each of which the data rate is derived. It may be possible that the set of link aggregation keys is part of a larger group of link aggregation keys available in the data communications system, wherein the method includes creating a plurality of link aggregation groups, each being allocated a link aggregation key subset from the larger group. Moreover, more than one link aggregation key may be assigned to a particular physical link.

Typically, egress data includes payload and identifying information. Accordingly, the deriving step may include calculating a key value from the identifying information, comparing the key value to the link aggregation keys in the set and calculating the data rate for one of the link aggregation keys to which the key value is a match. The identifying information may include source and destination addresses, and the step of calculating the key value may include performing a logic operation, such as XOR on the source and destination addresses (e.g., between n-LSB (least significant bits) of each of the source and destination MAC address).

The load balancing includes initial assignment followed by reassignment of the link aggregation keys in the set. The step of initially assigning them to physical links in the link aggregation group includes dividing the set of link aggregation keys into subsets, with such division forming a contiguous block of link aggregation keys within each subset, and assigning each subset to one of the physical links in the link aggregation group. The initial assignment may be characterized by a randomly chosen offset of the start of each contiguous block. The number of link aggregation keys initially assigned to each physical link may be weighted based on the capacity of such physical link. Then, the dynamic load balancing may include reassigning the link aggregation keys from one subset to another.

An embodiment of a system for providing dynamic load balancing of data communications is also possible with a plurality of physical links. The plurality of physical links may include wireless communication links. Each physical link is provided with capacity for transporting egress data or any part thereof. The physical links are configured as members of a link aggregation group in order to increase capacity. Such system may include a switch (or another routing device; collectively referred to as "switch"). The switch may include logic and storage operatively coupled to each other, wherein the storage embodies program code which operatively interacts with the logic to dynamically configure switching of egress data to the plurality of physical links based on changes in data traffic conditions.

Such system preferably includes an engine adapted to monitor data rates for each of the link aggregation keys based on egress data, as well as, a control module adapted to obtain the data rates from the engine and, in response to load imbalance conditions, perform dynamic load balancing that includes reassigning the link aggregation keys and interfacing with the switch to manage address/port reconfiguration. The engine may include performance counters and the control module is preferably software-based. Preferably, the engine is further adapted to derive the data rates from egress data by calculating key values and matching them to one of the assigned link aggregation keys. The engine may further include a table in which the data rate for each of the link aggregation keys is maintained. The switch typically includes a buffer for egress data and, therefore, the control module may be further adapted to monitor the buffer for overflow condition and in response trigger the dynamic load balancing. Finally, some of the aforementioned aspects and attributes may also apply to the system.

These and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 3A is a state diagram demonstrating dynamic load balance triggering events monitoring and key distribution upon detecting load balancing triggering event.

FIG. 3B is a state diagram demonstrating a dynamic link aggregation key redistribution upon failure or restoration of a link aggregation member which may precede dynamic load balancing.

DETAILED DESCRIPTION

The following description is provided in the context of this particular Application for Letters Patent and its requirements to enable a person of ordinary skill in the art to make and use the invention. Various modifications to the embodiments described and shown are possible and the generic principles defined herein may be applied to these and other embodiments without departing from the spirit and scope of the invention. Thus, the present invention is to be accorded the widest scope consistent with the principles, features and teachings disclosed herein.

The present invention is based, in part, on the observation that layer-2 link aggregation can be used in substantially all types of communications. Moreover, link aggregation, which is designed to increase link availability and bandwidth between two switches and to avoid the so-called loop problem in networks that use multiple parallel links, can be used to facilitate redundancy and traffic load balancing. Thus, layer-2 link aggregation is a proper platform for addressing redundancy and load balancing.

Redundancy is obtained, when a link fails, by diverting the failed link traffic to other links of the link aggregation group. With redundancy, a far-end switch receives Ethernet frames via the same logical link-aggregated port, even though such frames may come from different physical links. Load balancing distributes traffic load more evenly among the multiple links. Accordingly, dynamic load balancing for layer-2 link aggregation is a preferred load balancing approach in various embodiments of the present invention.

As noted, generally, in a system with near-end and far-end (transmit-receive) switches connected to each other via a plurality of physical links, link aggregation combines the plurality of physical links between such switches into a single logical link. The physical links so combined, form a link aggregation group (LAG) in which each of its links is a member of the LAG. Each member of the LAG has a set of one or more link aggregation keys (LAGKs) uniquely allocated to it. In other words, a plurality of physical links between two switches (e.g. Ethernet switches) are combined to form a single LAG with each member link thereof being uniquely allocated a subset of the available LAGKs. Each LAGK allocated to a physical link serves as a guide for switching packets with a matching key to such physical link.

For example, a microwave radio system, such as the Eclipse™ microwave platform, by Harris Stratex Networks, Inc., Morrisville, N.C., may implement link aggregation of two radio links at 155 Mbps transmission rate using one intelligent node unit (INU). Using one INU as suggested, link aggregation of two radio links can achieve a total bandwidth of 311 Mbps. To achieve a total of 622 Mbps bandwidth the link aggregation may use two INUs, each one having two 155 Mbps radio links. The two INUs can be linked with each other via respective user ports.

Figure 1A:
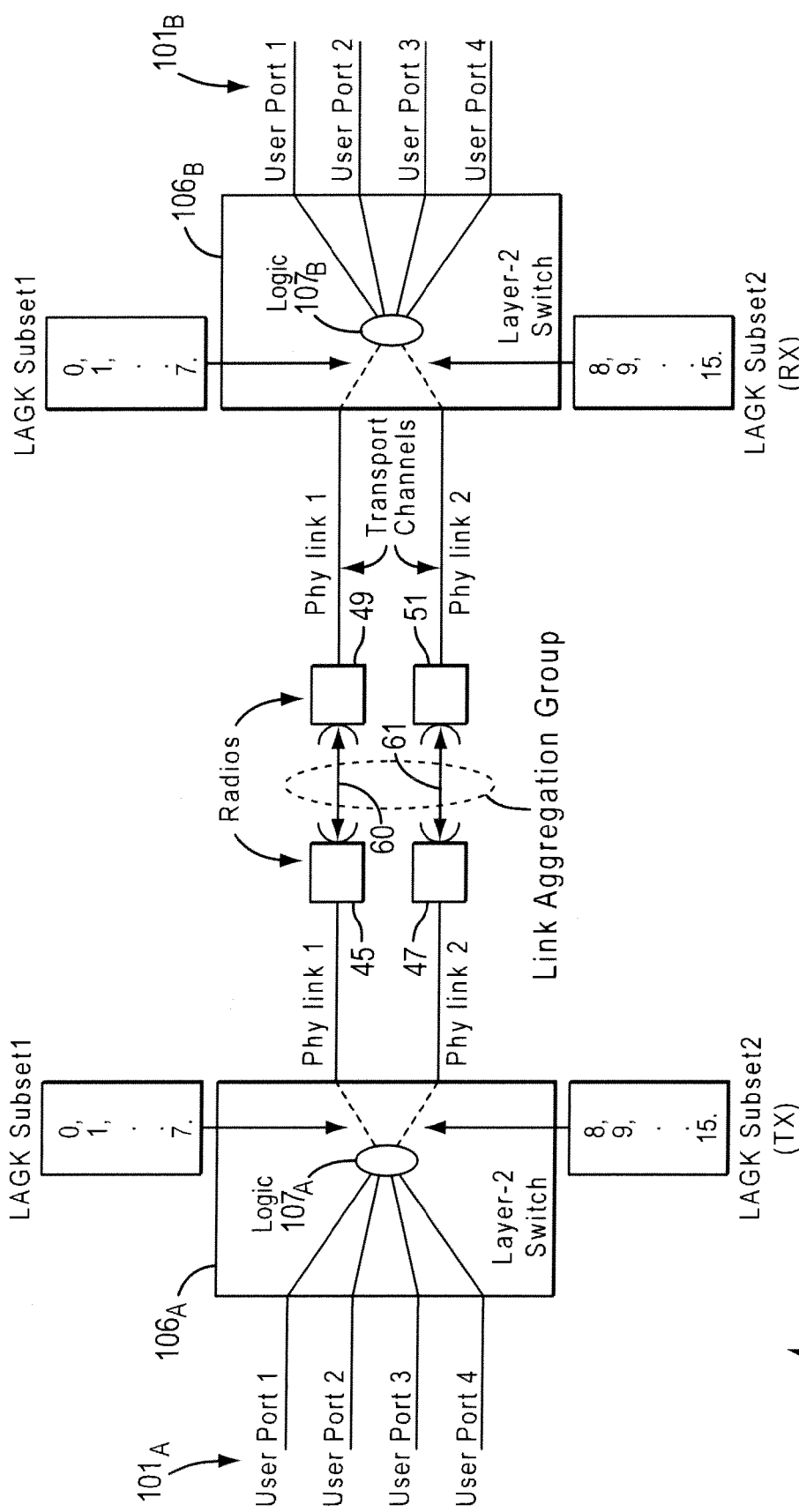
FIG. 1A illustrates a DAC-GE (Gigabit Ethernet data access card) link aggregation environment.

A layer-2 link aggregation may be implemented in a microwave radio system, such as the Eclipse™, with the dynamic load balancing as described herein. Typically, an algorithm for dynamic load balancing can be applied to link aggregation in a data access card (DAC). For example, the aforementioned Eclipse™ microwave platform may apply an algorithm for dynamic load balancing in a gigabit Ethernet data access card (DAC-GE). In one embodiment, the algorithm may be implemented in logic circuitry, such as field programmable gate array (FPGA), in combination with embedded software. FIG. 1A illustrates a DAC-GE link aggregation environment.

In such DAC-GE link aggregation environment, user ports on the DAC-GE provide typically Ethernet connections. Assuming the transmit (TX) side is on the left and the receive (RX) side is on the right, the packet frames are carried from left to right between the radios (45, 47 to 49, 51, respectively) through transport channels that include physical links 1 and 2. The packet frames are carried in the opposite direction when the roles reverse (or possibly in both directions when both can transmit and receive simultaneously). On the transmit (TX) side, the user ports 101 receive and forward Ethernet frames via a layer-2 switch 106 to each physical link member of the LAG, depending on its LAGKs (i.e., a packet is routed to a physical link with a designates LAGK that matches its own key). For this purpose, a layer-2 switch 106 may include switching logic 107 adapted for handling switching decisions concerning frames from the user ports.

The Ethernet frames carry source and destination MAC (media access control) addresses on the basis of which switching is resolved. The layer-2 switch may further include a switching or address resolution table with a dynamic configuration of the network, including which user port is connected to which device (with each device being identified by a particular MAC address). In this environment, there are 16 possible LAGKs (0, 1, . . . , 15). As shown, on the TX and RX sides, respectively, the 16 LAGKs are divided into two subsets, LAGK subset 1 (LAGK 0, 1, . . . , 7) designated for physical link 1 and LAGK subset 2 (LAGK 8, 9, . . . , 15) designated for physical link 2. In this instance, the LAGKs in each layer-2 switch 106 are each defined as:

$$LAGK = DMAC(\text{4 least significant bits}) \text{ XOR } SMAC(\text{4 least significant bits})$$

where DMAC is the destination MAC address and SMAC is the source MAC address of an Ethernet frame (this definition is exemplary and other definitions are possible).

Note that the layer-2 switch assigns a particular LAGK uniquely to a particular physical link (switch egress port) member of the LAG (although each physical link may have a subset of LAGKs (i.e., more than one LAGK) assigned to it. In view of the definition above, a LAGK derived from an Ethernet packet determines the physical link in a LAG through which such Ethernet packet is forwarded.

Accordingly, for each Ethernet frame received in the layer-2 switch on the TX side (i.e., at the local or near-end side), a first forwarding decision as to which destination (layer-2 switch user port at the far-end (RX) side) should receive the Ethernet frame can be made based on the MAC addresses. This decision can be made by looking at the address resolution table (ART) if the MAC addresses (e.g., unicast or multicast DMAC addresses) are learned; and if the MAC addresses are not learned, as in broadcast, a forwarding decision to carry on with the broadcasting can be made. Secondarily, the local switch calculates the LAGK for the Ethernet frame by using its DMAC and SMAC addresses. The switch then forwards the Ethernet frame to the user port at the far end via the physical link (in this instance 1 or 2) to which a LAGK matching the calculated LAGK value has been pre-assigned (e.g., programmably). Preferably, the assignment of LAGKs is dynamic to address changing network conditions, as will be later explained.

The LAGK assignments at the near-end and far-end layer-2 switches are not required to be symmetric. For example, the DAC-GE in the Eclipse™ may use a link aggregation and load balancing algorithm that is distinct to the near and far-end sides, respectively. Consequently, the LAGK assignments set the rules at each layer-2 switch for forwarding Ethernet frames traffic to the physical links within the LAG.

When forwarding traffic, load balancing in LAGs may be necessary from the start because the initial assignments of LAGKs may be programmed without any information on traffic conditions such as traffic statistic or pattern information. Moreover, traffic conditions may change with time and result in unbalanced traffic load. The traffic directed to one physical link could be heavier than that directed to another physical link in the LAG. The traffic imbalance and, in turn, overloaded physical links, may cause frame losses due to buffer overflow or increased waiting delays. In the case of traffic load imbalance, redistribution of the load can help even out the load.

Preferably, load balancing is achieved by reassigning LAGKs. Load balancing is typically implemented as software-based reconfiguration by reprogramming the switch 107 to assign LAGKs to members in a LAG. In reality, changes in traffic conditions occur dynamically and, therefore, preferably, reassignment of the LAGKs should be dynamic.

When implementing a load balancing algorithm to achieve dynamic load balancing in link aggregation, a number of considerations may apply. For instance, because load balancing is preferably dynamic, it can be carried out only when it is truly necessary. Implementing it this way reduces overhead. That is, even when traffic load is unbalanced among LAG members, load balancing is not necessary unless there is a problem such as loss of frames. This consideration may be important because any reallocation of LAGKs can cause disorder in the network (links) configuration and possibly momentary traffic disruption. In one possible scenario, frame synchronization failure may exist when traffic is redirected from a very crowded link to one with light traffic. In this case, frames sent via a crowded link may be delayed due to buffering and arrive later than frames carried by lightly loaded links. The time interval of such delays may be very short (less than 400 μs) but nevertheless can affect the traffic and require load balancing if it produces synchronization failure.

Another consideration that may apply to the load balancing algorithm is a need to provide the quickest response possible after a frame loss is discovered in order to prevent further frame losses. A related consideration in implementing the load balancing algorithm may be the need to converge into a steady state of traffic conditions as quickly as possible after a failure is detected.

In one instance, the algorithm for dynamic load balancing in link aggregation may be divided into two parts: 1) initial allocation of LAGKs, and 2) dynamic load balancing.

The part of initial allocation of LAGKs includes dividing the total number of available LAGKs (e.g., sixteen LAGKs) into subsets of LAGKs and assigning them to the members of the LAG. The initial allocation of LAGKs may be characterized in that it forms contiguous blocks of LAGKs in the subsets. This is useful to avoid subsets with all odd or all even LAGKs. The initial LAGKs allocation may be further characterized by a randomly chosen offset of LAGKs subset where the initial position of the contiguous block (subset) of LAGKs is randomly generated by software each time the switch is reset. Another possibility is that the numbers of LAGKs allocated for each link are weighted by configuration based on link capacity. The weight for each subset or member of the LAG can be configured depending on its link capacity. As an example, for a LAG that consists of two links (one with 311 Mbps (2×155 Mbps) and one with 155 Mbps) the weights can be configured as:

| Link | Weight | LAGK subset |
|---|---|---|
| 311 Mbps | 11 | (4, 5, 6, 7, 8, 9, 10, 11, 12, 13, 14) |
| 155 Mbps | 5 | (15, 0, 1, 2, 3) |
| Total | 16 | |

Figure 1B:
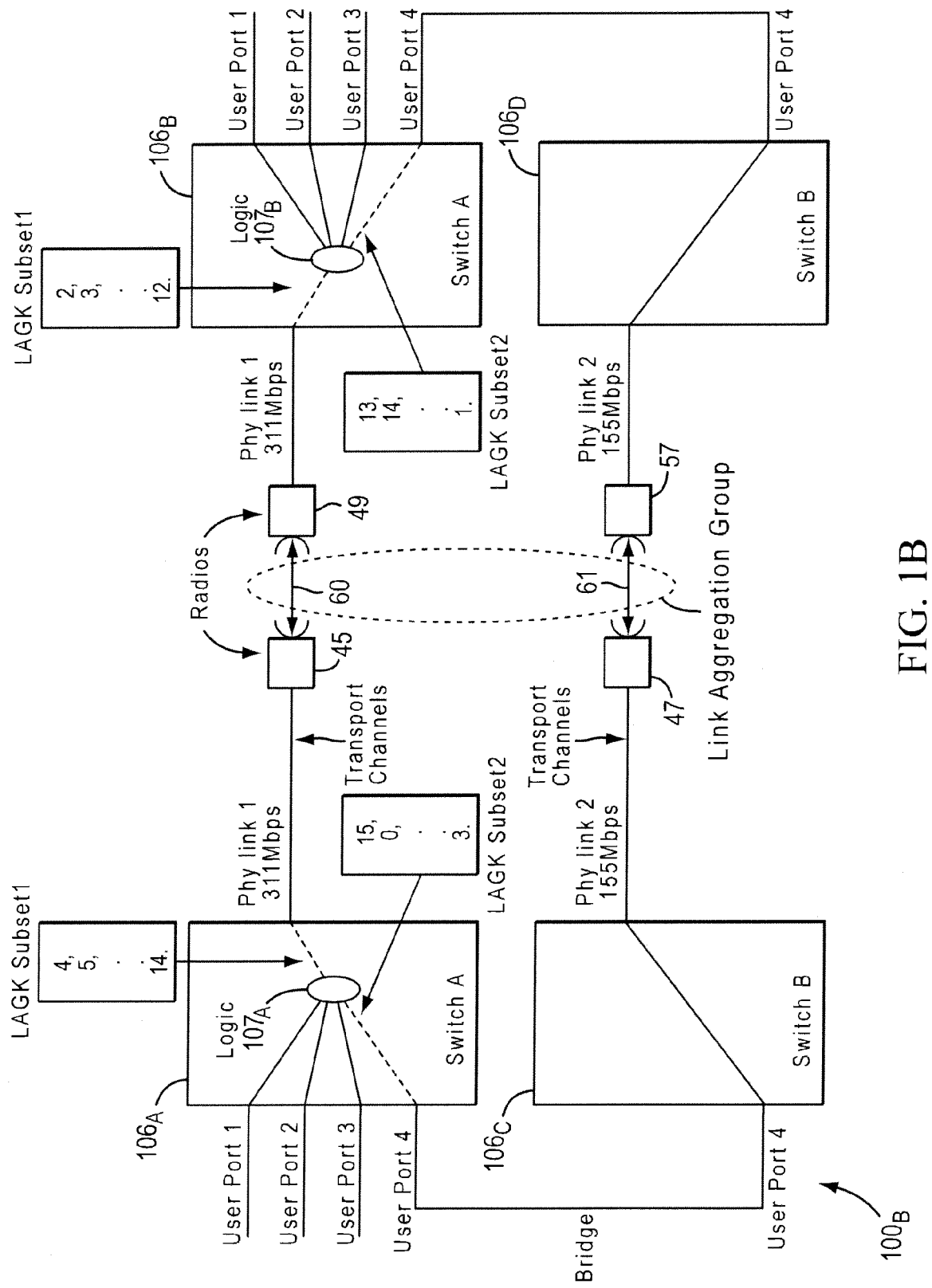
FIG. 1B is a diagram that shows a link aggregation configuration using two DAC-GEs at each end that could be implemented on an Eclipse™ platform.

In FIG. 1B, a diagram is shown of a possible configuration for this example on the aforementioned Eclipse™ platform. This configuration is based on radios (e.g., 45 and 47 at the near-end and 49 and 51 at the far-end) linked to each other via respective user ports 4—such as the optical ports—that are bridged as shown. The bridging of user ports of respective switches forms a chain of multiple radios to create link aggregation. In this instance, bridging allows two physical links to be combined and form a single LAG with the 16 available LAGKs divided between member links of the LAG. The ports have, respectively, 311 Mbps and 155 Mbps link capacity, and the total bandwidth of the link aggregation in this example is 466 Mbps. As mentioned, the assignment of LAGKs need not be symmetric and, as shown in this example, the LAGKs assignment at the near and far-end switches is asymmetric (different at each end).

From the foregoing example one could contemplate the possibility of building a "second stage" link aggregation, if the second switch $106_{C,D}$ is configured to set an additional link aggregation (the second switch inside an intelligent node unit (INU) of the Eclipse™ platform). Preferably, however, building the "second stage" link aggregation may be avoided because of the restricted LAGKs of ingress traffic to the second switch.

The second part of the foregoing algorithm is the dynamic load balancing part. Dynamic load balancing is preferably based on physical link capacity, egress buffer status and egress data rate per LAGK. Physical link capacity information provides the maximum data rate supported by the physical link. The egress status information is used as trigger to a request for load balancing. The egress status information exists already in the switch in the form of egress used RAM, frame drop due to lack of transmit buffer for each physical link (port) of LAG, etc. The means for establishing egress data rate per LAGK may be implemented in the DAC-GE's FPGA with a performance counter for each LAGK. These counters measure the current data rate (in Kbps) for each LAK in, for instance, 1-10 seconds time intervals. With knowledge of the traffic load associated with each of the LAGKs, the algorithm can perform better the load balancing.

In the case of link aggregation via chained INUs (chained user ports via bridges), the foregoing scheme may require hardware support or in-band communication channel to obtain the chained INU's LAGK performance counters. The performance counters can be implemented in an extended bus, proprietary bridge protocol data unit (BPDU) via an Ethernet interface (issued by the internal CPU of the switch). The virtual link capacity of the chained ports for load balancing purposes should be the ultimate radio link capacity instead of the user interface capacity, which is typically 1000 Mbps.

In each INU, the DAC-GE can be designed with a processing engine for performing the dynamic load balancing and, as will be later described, utilizing rapid channel failure detection (RCFD) for the layer-2 link aggregation. Various configurations of the DAC-GE are possible although, as shown in FIGS. 2A, 2B and 2C, the preferred design employs a hardware-assisted implementation in an FPGA, CPLD, ASIC-based processing engine or other logic circuitry (we refer to these implementations collectively as the "FPGA-based processing engine" or simply "processing engine").

Figure 2A:
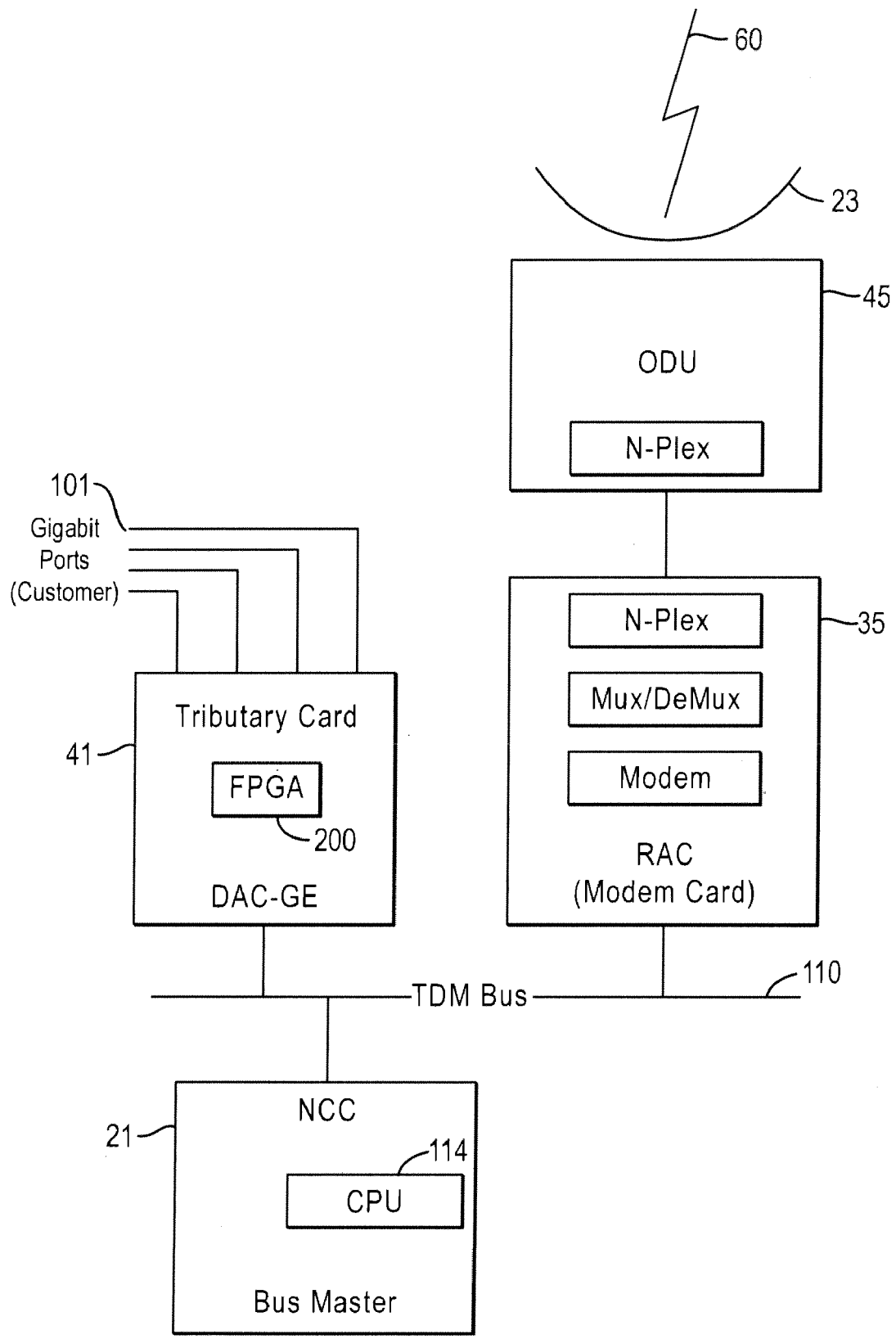
FIG. 2A is a block diagram showing a DAC-GE in the INU (intelligent node unit) of a node in a wireless communication system.
Figure 2B:
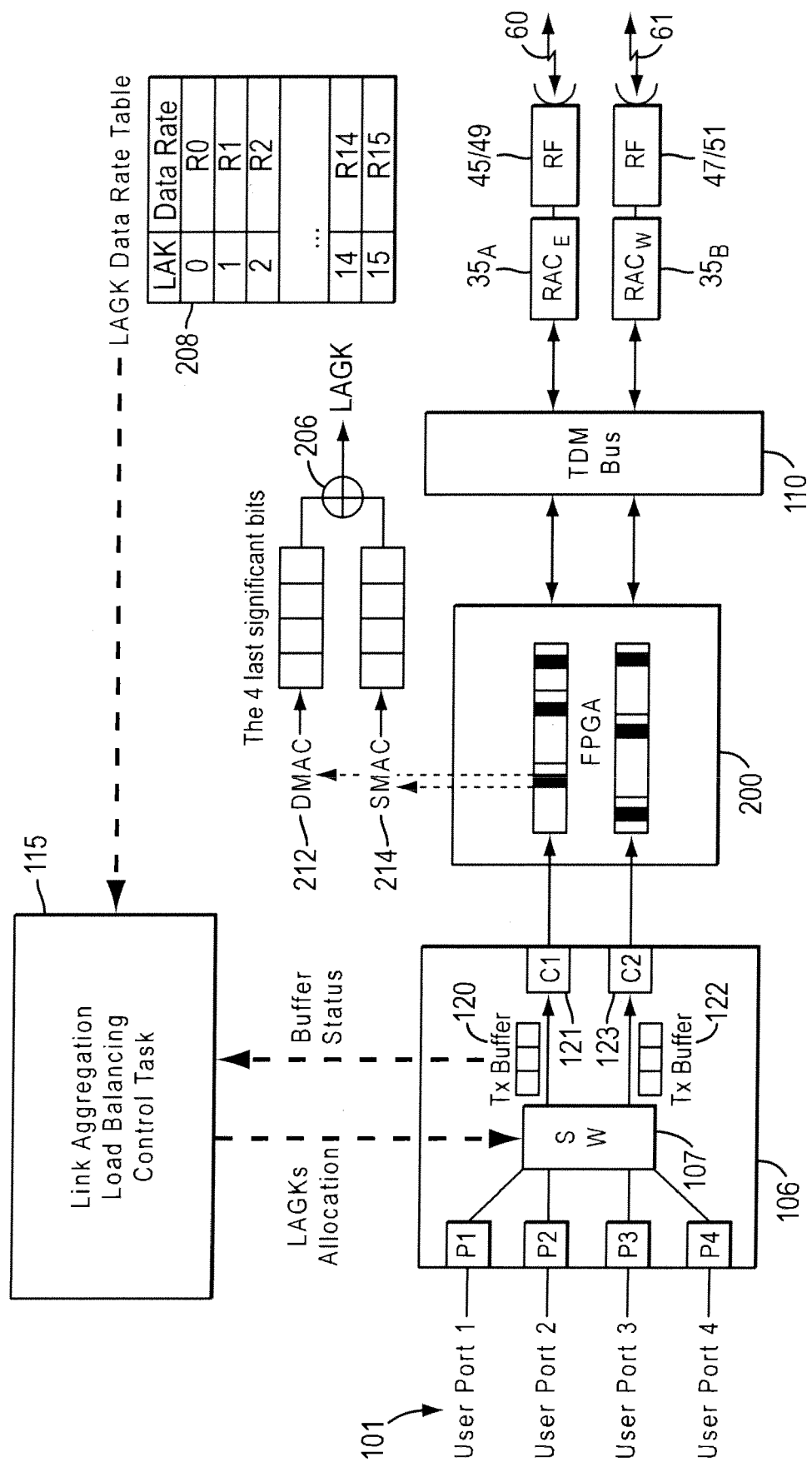
FIG. 2B is a block diagram of a DAC-GE.
Figure 2C:
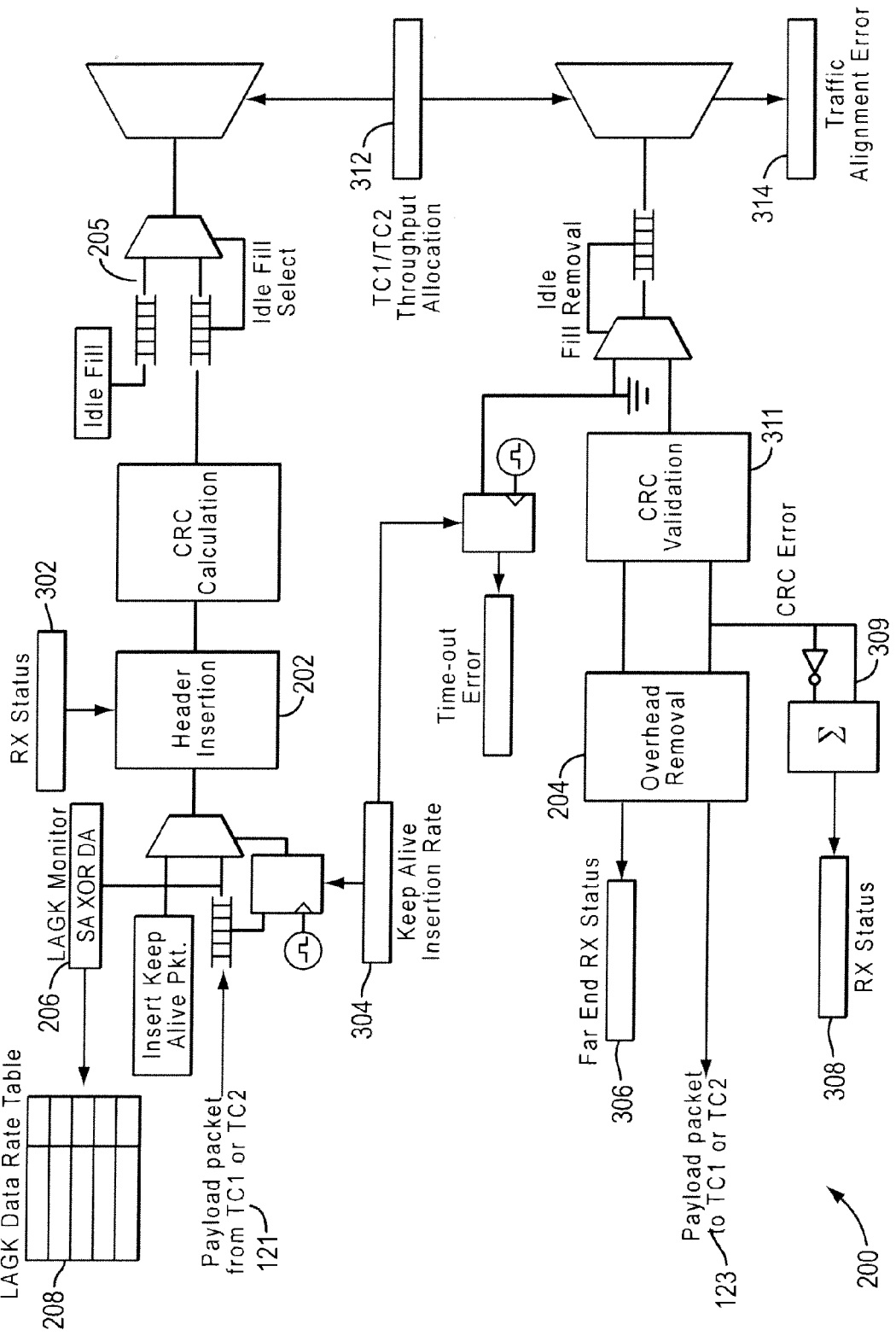
FIG. 2C is a block diagram of an FPGA-based processing engine with failure detection and link aggregation key rate monitoring functions.

An implementation on the DAC-GE of an FPGA-based processing engine for this purpose is depicted in FIGS. 2A, 2B and 2C. In particular, FIG. 2A is a block diagram showing a DAC-GE in the INU of a node in a wireless communication system. The DAC-GE includes functionality that enhances failure detection and recovery without compromising throughput, providing, for instance, below-50 ms failure response time. The DAC-GE interfaces with a customer data system via user ports 101 on one side and with a radio access card (RAC) 35 on the other. The data from the RAC flows to an outdoor unit (ODU) 45 (in a split mount system such as the Eclipse™) and through the antenna 23 and wireless link 60. In the INU, a TDM (time division multiplexing) bus 110 provides the backbone through which various cards such as the node control card (NCC) 21, DAC-GE 41 and RAC 35 are connected. The NCC includes a processor 114 and functions as a bus master controlling access by the various cards including the DAC-GE card 41.

As further shown, an FPGA 200 resides in the DAC-GE card 41 and its functionality is provided to facilitate the layer-2 link aggregation, LAGK rate (data rate) monitoring and accumulation, and detection of carrier failures. The CPU 114 in the node control card (NCC) 21 is operative to perform a data rate monitoring and load balancing control function (including monitoring the LAGKs rates accumulated by the FPGA 200 in the LAKG table 208 and deciding when to trigger dynamic load balancing). In response to input from the CPU 114 in the NCC 21, a processor (e.g., switch logic 107) in the switch is operative to configure and reconfigure the switch 106 (FIGS. 1A,B) to the new capacity of the remaining available carriers. The traffic is distributed via the switch in the DAC-GE card but the CPU in the NCC card does the reconfiguration. In other words, the switch on the DAC-GE card is dynamically reconfigured under control of the CPU in the NCC card based on operation (failure detection etc.) of the FPGA.

Note that there could be multiple hops between the particular node and other nodes in the wireless communications system. Nevertheless, the load balancing and failure detection and recovery operations of the DAC-GE are indifferent to the number of hops and they beneficially facilitate network end-to-end failure detection, recovery and load balancing. Moreover, to be effective, the DAC-GE 41 should be deployed in the INU of at least two of nodes in such system.

As shown in the block diagram of the DAC-GE, at FIG. 2B, the layer-2 switch 106 includes the switching logic 107 and user ports 101. Ethernet frames entering the switch 106 via user ports 101 are queued in transmit buffers 120, 122 by the switching logic 107 to be routed to the proper channel 121, 123 (based, for instance, on an address resolution table). Then, the FPGA 200 is configured to intercept the switched outgoing Ethernet frames in order to derive from them the LAGKs and data rate and to forward the Ethernet frames from the DAC-GE to a respective RAC $35_{A,B}$ via the TDM bus 110. In accordance with one embodiment, the FPGA 202 is configured to derive the DMAC (destination MAC 212) and SMAC (source MAC 214) from the intercepted Ethernet frames and perform a XOR operation on the 4-LSB (least significant bits) of the DMAC and SMAC to calculate the LAGK. As mentioned, the FPGA accumulates the calculated LAGKs in table 208.

As mentioned above, link aggregation is used in point-to-point communications with multiple physical links (trunks) to group them into one pipe instead of the links working independently. For this purpose, the LAGKs are used as identifiers of Ethernet frames traffic segments for switching decisions (which segment goes to which physical link) and as tool for creating load balancing. Thus, in this embodiment, the calculated LAGK is one of 16 possible LAGKs and it corresponds to one of 16 rows in a LAGK data rate table 208. The second column of this table includes the data rates for each of the 16 LAGKs. These rates are updated according to the LAKGs derived from the Ethernet frame traffic.

The information in the LAGK rate table 208 is available to the link aggregation load balancing control 115 in the NCC 21 which, in this embodiment, is a software module tasked with processing the data rate information. Specifically, the link aggregation load balancing control module 115 obtains the transmit channel buffer status from the layer-2 switch 106 and in combination with the data rate (LAGKs rate) information from the LAGK rate table it can determine how best to reallocate the LAGKs in order to balance the load in case of a traffic load imbalance. Turning for a moment to the state diagram of FIG. 3A, it demonstrates monitoring control of load balancing upon discovering a triggering event. As shown, there is no load balancing activity as long as there is steady-state operation 135. However, once a triggering event (1) is discovered, such as loss of packets, substantial load imbalance or other failures, the load balancing control may activate the load balancing task. Upon recovery the system reaches steady-state operations and the load balancing task can cease its operation.

Turning back to FIG. 2B, the manner in which the software module of the load balancing control 115 performs its load balancing task can be implemented a number of ways one example of which is provided below as an algorithm in the form of a set of program instructions.

In general terms, the dynamic load balancing algorithm includes monitoring the physical links in the LAG and traffic load updating. The traffic updating includes detecting a frame drop (buffer overflow) condition and accumulating the related traffic data rates for calculating corresponding traffic loads. The monitoring includes detecting conditions that trigger load balancing. Once link overload conditions are detected, the load balancing described above can be triggered provided there are other links with available capacity to take over some of the load.

More specifically, the proposed algorithm, including program instructions for an initialization and the dynamic load balancing main loop, is described in a pseudo-C program as follows:

```
/****************************************************************/
/* A pseudo-"C" program that describes DAC-GE's    */
/* Algorithm of Dynamic Load Balancing for Link Aggregation */
/* Copyright 2005-2007, Harris Stratex Networks Inc.         */
/****************************************************************/
/***********/
/* Define */
/**********/
#define K 16     /* Maximum number of link aggregation keys */
int   N;        /* Number of physical links of the LAG */
int   R[K];     /* Data rate of link aggregation key k from FPGA */
int   W[N];     /* Weight or number of link aggregation keys assigned for link n */
bool  FDrop[N]; /* True or False for frame drop on link n */
int   LAGK[N][K]; /* Set of link aggregation keys allocated to link n */
int   Rate[N];  /* Total traffic rate in Kbps on link n */
int   Cap[N];   /* Capacity in Kbps (radio link) of the link n */
int   Load[N];  /* Traffic load (0-101) on link i, measured as 100*(R[n]/C[n]) */
int   Max_Load; /* Overflow Threshold level of traffic load (0-101)*/
int   Min_Load; /* Level of traffic load (0-101) below which more traffic is allowed */
/******************/

/* Initialization */
/******************/
/* Randomly chose an initial LAGK offset (0-15) */
K0 = Random(K);
for (n=0; n<N; n++)   /* for all physical links of LAG */
{
   /* Allocate subset LAGK[n] with its weight */
   for (k=0; k<W[n]; k++)
```

```
    {
       LAGK[n][k] = (KO + k) % K; /* wraps around to 0 when k>15 */
    }
    KO = KO + W[n]; /* next offset starts at end of this block */
}
/**************/
/* Main Loop */
/**************/
/* main loop for load balancing */
while(not_end && not_config_reset)
{
    /* update traffic load of all links of LAG */
    for (n=0; n<N; n++)
    {
        /* detect the condition frame drop (buffer overflow) */
        if (FDrop[n] == TRUE)
        {
            Load[n] = 101; /* Overflow condition */
        }
        else
        {
            /* first update traffic data rate for link n */
            Rate[n] = 0;
            for (k=0; k<W[n]; k++)
            {
                Rate[n] += R[LAGK[n][k]]; /* accumulate related LAGK data rate */
            }
            /* calculate the traffic load */
            Load[n] = 100 * (Rate[n]/Cap[n]);
        }
    }/* end of update traffic load */
    /* monitor all links */
    for (n=0; n<N; n++)
    {
        /* detect the condition that triggers load balancing */
        if (Load[n] >= Max_Load)
        {
            /* check for existence of another link with spare capacity */
            for (s=0; s<N; s++)
            {
                if (s == n) continue; /* jump on itself */
                if (Load[s] < Min_Load)
                {
                    /* Find a suitable key k from link n to link s, in order to balance the load.
                       It depends on its date rate R[k] such that resulting Rate[s]<Max_Load */
                    k = transfer_suitable_LAGK(n, s);
                    /* if found a suitable key to transfer, jump to next link */
                    if (k == NULL) continue;
                    /* spare link s add one LAGK and its data rate */
                    W[s]++;
                    Rate[s] = Rate[s] + R[k];
                    Load[s] = 100 * (Rate[s]/Cap[s]);
                    /* crowded link n substract one LAGK and its data rate */
                    W[n]--;
                    Rate[n] = Rate[n] - R[k];
                    Load[n] = 100 * (Rate[n]/Cap[n]);
                    /* if resulting load on link n is below overflow threshold, finish
                       load balancing for it */
                    if (Load[n] < Max_Load) break; /* exit from for (s=0; s<N; s++) */
                }
            }
        }
    } /* end of monitoring all link */
} /* while */
/************** END **************/
```

To implement this algorithm, as shown in FIG. 2C, the FPGA-based processing engine 200 is deployed with a LAGKs rate monitoring function to facilitate the dynamic load balancing for the layer-2 link aggregation. The processing engine 200 is shown operatively connected to the transport channels TC1/TC2 (121, 123) for receiving packets from the layer-2 switch (106 FIG. 2B). At an opposing end, the processing engine is operatively connected to the backplane interface (110, FIG. 2A). The processing engine is configured to transform the packets it receives into suitable blocks (with associated time slots) to be carried by the backplane to the wireless communication links.

For the LAGKs rate monitoring function, the processing engine 200 intercepts incoming packets 121 via its LAGK monitor 206 and derives the LAGKs from packets using, in this case, the XOR function. The sizes of the Ethernet frames associated with the derived LAGKs are accumulated in the aforementioned LAGKs rate table 208 (which has a row for each LAGK). Each time a LAGK is derived, its row in the table is incremented by the associated Ethernet frame size.

The values in the table indicate the number of throughput rate for each LAGK. Hence, the traffic load can be observed by monitoring the values inside the table. Higher values indicate heavier traffic load for such LAGK, and in turn heavier traffic load on the corresponding physical link.

As further shown, it is possible to combine in a processing engine the failure detection and restoration with the foregoing dynamic load balancing and utilize both for the layer-2 link aggregation. Thus, in one embodiment, the detection of failure and restoration and recovery of links is also implemented on the DAC-GE in the aforementioned FPGA-based processing engine. Advantageously, the link aggregation in combination with such hardware-assisted RCFD algorithm may allow failure response and recovery within hundreds of microseconds rather than the seconds it would take when using a standard messaging approach. In particular, with the DAC-GE installed in the INUs of a wireless radio system it would be able to operate at twice the speed using two radio links and sending packets on each channel. The RCFD algorithm is resilient to error propagation and eliminates unnecessary switchover. Because of the fast detection of a link failure or fading conditions the protected system will rapidly switch to a single link. The redundancy characteristics of a LAG in combination with the RCFD algorithm operate to redirect the traffic among the remaining reliable physical links. The switching and queuing of the packets is reorganized by a link aggregation control task residing in the Ethernet switch present in the DAC-GE.

Additionally, taking advantage of the unidirectional failure detection capabilities of an RCFD algorithm, a link aggregation system could have an asymmetric behavior by having the full link throughput available in one direction while using only a limited throughput (due to unidirectional link failure) in the other. This is the case of video-broadcasting systems or other applications that heavily use broadcast or multicast transmission or that are asymmetric in nature. From the dynamic load balancing design prospective, it is possible to keep the link and perform load balancing only in one direction and not the other.

As implemented, the health of a carrier (link) is conveyed in an extended header to nodes on both sides of the link (e.g., at each end of the wireless communication link). Specifically, the processing engine 200 in the DAC-GE at each node keeps the extended header with the TX and RX status information. The TX status is a reflection of the far end node's RX status indicator that is conveyed in the header of the received packets. The RX status is computed based on information obtained from the traffic alignment indicator 314 as well as the received packets and their integrity. The traffic alignment is intended for maintaining the integrity of packets that have been divided into segments and need to be re-constructed properly. In this design, a set of configurable registers allows adjustment of the system behavior to meet particular carrier class specifications.

These registers are: keep-alive insertion rate, packet receive timeout, CRC (cyclic redundancy check) validation threshold and CRC error threshold. The keep-alive packet insertion rate register 304 represents the rate in microseconds that the packet insertion engine will wait before inserting a keep-alive packet (under idle traffic conditions). The packet receive timeout register 310 represents the number of microseconds that the receive engine will wait for a packet before declaring an idle RX timeout, The CRC validation threshold register 311 represents the number of consecutive good CRC packets that will have to be received in order to change RX status from bad to good. The CRC error threshold register 309 represents the number of consecutive bad CRC packets that will have to be received in order to change RX status from good to bad. The two configurable CRC registers provide a hysteresis to avoid bad-good status oscillations on a small number of errors.

One of the requirements for the failure detection algorithm is to be independent from the presence of payload traffic in the channel. To be able to meet such requirement, the algorithm is designed to detect the absence of payload traffic (idle) and insert keep-alive packets that will maintain the link status. The format of a keep-alive packet is basically the same as a normal payload packet format but without the payload segment and it conveys the same status and integrity information.

Note that the approach of using multiple physical links to transport Ethernet traffic between two Ethernet switches is typically intended to achieve increased link availability and bandwidth while avoiding loop formation. However, the detection and the switching in an existing system would commonly be made within 100 ms; and failure recovery could take seconds using a standard messaging approach. Thus, to achieve or exceed carrier class Ethernet transport channel standards the link aggregation depends on fast failure detection and recovery implemented, for example, as described above.

FIG. 3B is a state diagram demonstrating a dynamic link aggregation key redistribution upon failure or restoration of a link aggregation member which may be invoked before dynamic load balancing. The behavior depicted in the state diagram improves the overall link availability by converting, for example, a 2+0 link operation into a 1+0 operation when a link failure occurs ("+0" typically means no standby operation mode). It is important to note that with the key redistribution, the total traffic is shifted to the remaining link aggregation members (LAGMs). Thus, from steady state 134, upon detecting the failure the state switches to distributing LAGK to remaining LAGM 132. In other words, with this approach, traffic flow of failed links is redistributed, rather than being suspended, with the remaining links (LAGMs) taking over for failed links temporarily until they are restored so that recovery is fast and the entire traffic flow can continue.

This approach has significant advantages over conventional techniques that maintain only the traffic flow associated with the designated keys of the remaining LAGMs and the traffic flow associated with keys of failed LAGM is suspended (starved) until the link that failed is restored. Indeed, when a link fails the entire traffic continues to flow, although the overall link aggregation throughput is reduced if the total number of keys is redistributed over the remaining LAGM(s); and if congestion conditions are reached traffic prioritization and flow control takes over to maintain the flow.

When failure conditions disappear, the link aggregation in combination with rapid channel failure detection and recovery restores the total throughput of the link and reassigns the original LAGK set to the newly restored LAGM 136. If any additional redistribution is required it takes place in this same iteration.

Once link failure or link restoration (TX or RX status changes) is detected, the LAGM is marked for key re-distribution in the case of failure and for key re-assignment in the case of restoration. For each link not previously accounted for (not yet assigned a key), the combined link aggregation and rapid channel failure detection algorithm determines if the LAGM is marked and, if so, a key is re-distributed to it upon failure or reassigned to the original LAGM upon restoration.

Figure 4:
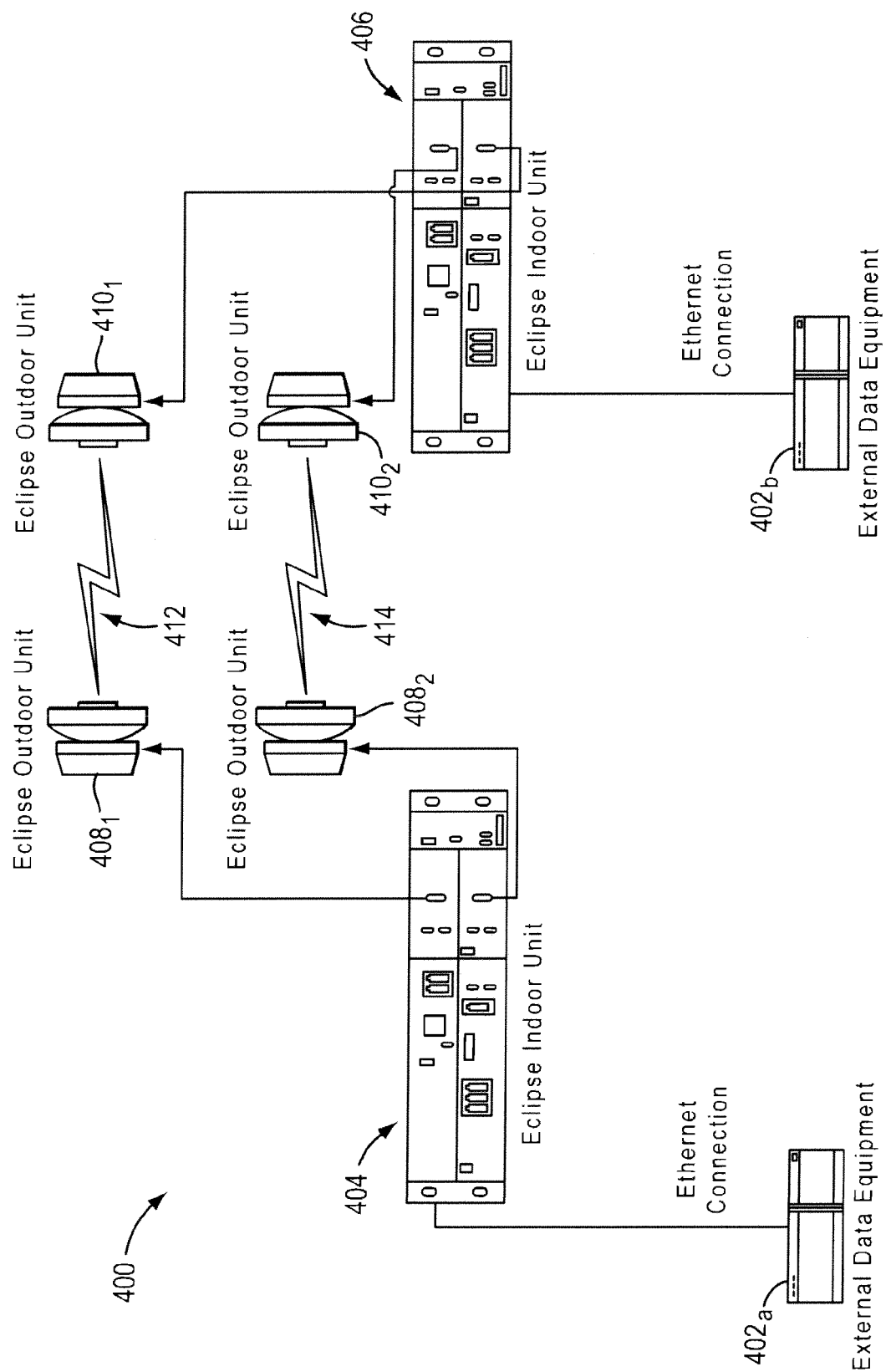
FIG. 4 shows the architecture of a 2+0 Microwave radio link configurable for link aggregation with dynamic load balancing.

As an example, the foregoing approach to dynamic load balancing for layer-2 link aggregation can be implemented in a wireless radio platform such as the Eclipse™. FIG. 4 shows the architecture of a 2+0 Eclipse™ Microwave radio link configurable for link aggregation with dynamic load balancing. As shown, such system uses a radio path 412 to carry a portion of the total packet traffic and the other radio link 414 to carry the remaining portion of the total packet traffic.

In sum, although the present invention has been described in considerable detail with reference to certain preferred versions thereof, other versions are possible. Therefore, the spirit and scope of the appended claims should not be limited to the description of the preferred versions contained herein.

What is claimed is:

1. A method for providing dynamic load balancing in a data communications system, comprising:
   creating a link aggregation group in a data communications system with a plurality of physical links each of which having a capacity for transporting egress data or any part thereof, the link aggregation group formed by combining two or more of the plurality of physical links into a single logical link for egress data;
   allocating to the link aggregation group a set of link aggregation keys with each link aggregation key being assigned to a particular one of the physical links in the link aggregation group;
   deriving from egress data a data rate for each of the link aggregation keys;
   performing dynamic load balancing based on the data rates and capacities of the physical links in the link aggregation group; and
   wherein performing dynamic load balancing comprises reassigning at least one of the set of link aggregation keys from a first physical link of the plurality of physical links in the link aggregation group to a second physical link of the plurality of physical links in the link aggregation group; and
   wherein the egress data is provided over the second physical link of the plurality of physical links in the link aggregation group based on the key value and the reassigned matching link aggregation key.

2. The method of claim 1, wherein the dynamic load balancing includes detecting conditions that trigger load balancing.

3. The method of claim 2, wherein the conditions include a frame drop associated with an egress buffer overflow status.

4. The method of claim 3, wherein the dynamic load balancing further includes monitoring the egress buffer overflow status.

5. The method of claim 1, wherein the dynamic load balancing includes monitoring traffic loads based on egress data and accumulating the data rates for calculating the traffic loads.

6. The method of claim 1, further comprising monitoring for changes in data communications system conditions, including failure and recovery, based on which the dynamic load balancing is triggered.

7. The method of claim 6, wherein the changes include failure or recovery of a physical link which result in diversion of egress data to remaining one or more of the physical links in the link aggregation group.

8. The method of claim 1, wherein egress data includes one or more frames, and wherein the method further comprises triggering the dynamic load balancing upon discovering a loss of one or more such frames.

9. The method of claim 1, wherein egress data includes a plurality of frames, and wherein the method further comprises triggering the dynamic load balancing upon discovering a loss of synchronization between such frames.

10. The method of claim 1, wherein egress data includes payload and identifying information, and wherein the deriving step includes calculating a key value from the identifying information, comparing the key value to the link aggregation keys in the set and calculating the data rate for one of the link aggregation keys to which the key value is a match.

11. The method of claim 10, wherein the identifying information includes source and destination addresses, and wherein the step of calculating the key value includes performing a logic operation on the source and destination addresses.

12. The method of claim 11, wherein the logic operation includes performing a XOR operation between n-LSB (least significant bits) of each of the source and destination address.

13. The method of claim 11, further comprising using the source and destination addresses in an address resolution table lookup for making a forwarding decision about egress data.

14. The method of claim 10, further comprising using the key value in making a forwarding decision for the egress data by selecting a physical link with an assigned link aggregation key that matches the key value.

15. The method of claim 10, wherein egress data includes a plurality of frames each of which having its own payload and identifying information from which a respective key value is calculated and as to each of which the data rate is derived.

16. The method of claim 1, wherein the set of link aggregation keys is part of a larger group of link aggregation keys available in the data communications system, and wherein the method includes creating a plurality of link aggregation groups, each being allocated a link aggregation key subset from the larger group.

17. The method of claim 1, wherein more than one link aggregation key is assigned to a particular physical link.

18. The method of claim 1, wherein the step of allocating the set of link aggregation keys includes initially assigning them to physical links in the link aggregation group by dividing the set of link aggregation keys into subsets, with such division forming a contiguous block of link aggregation keys within each subset, and by assigning each subset to one of the physical links in the link aggregation group.

19. The method of claim 18, wherein the initial assignment is characterized by a randomly chosen offset of the start of each contiguous block.

* * * * *